No. 829,337. PATENTED AUG. 21, 1906.
S. HERR.
COLOR CHANGING SCREEN.
APPLICATION FILED JAN. 2, 1906.
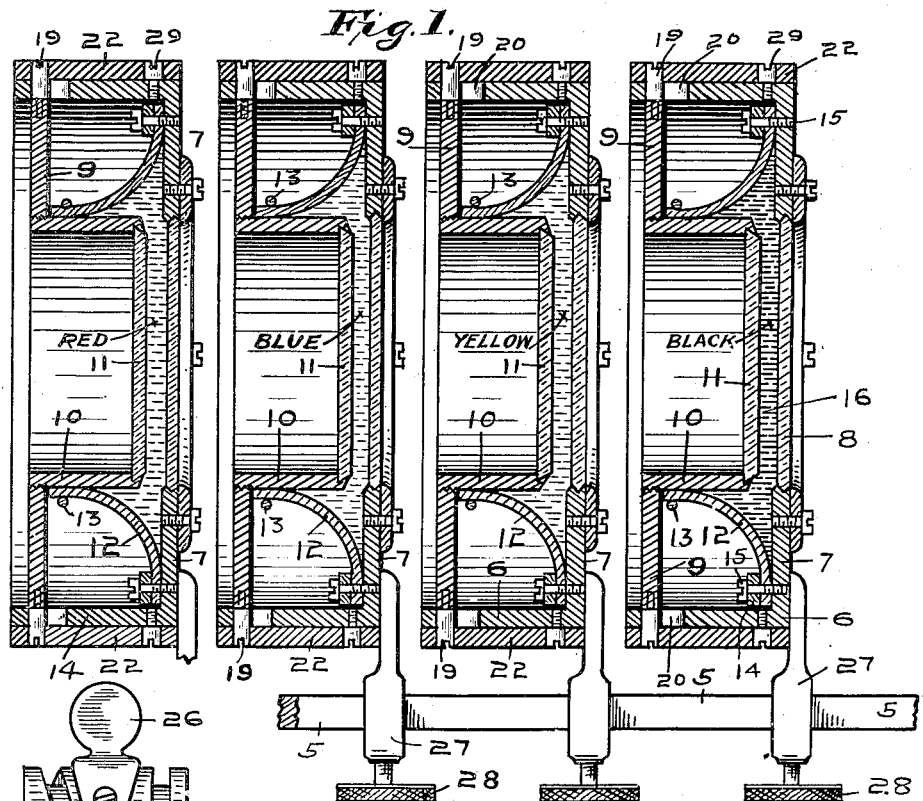
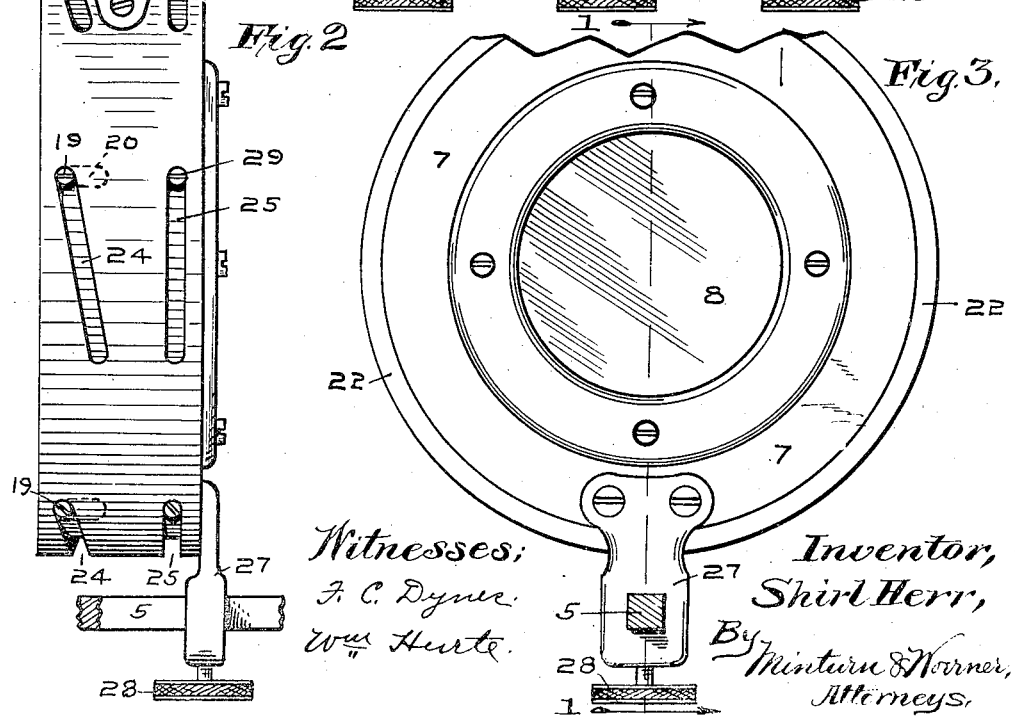
Witnesses:
F. C. Dynce
Wm Hurte
Inventor,
Shirl Herr,
By Minturn & Norner,
Attorneys.

UNITED STATES PATENT OFFICE.

SHIRL HERR, OF LEBANON, INDIANA, ASSIGNOR OF TWO-THIRDS TO CHARLES HERR AND JOHN HERR, OF LEBANON, INDIANA.

COLOR-CHANGING SCREEN.

No. 829,337. Specification of Letters Patent. Patented Aug. 21, 1906.

Application filed January 2, 1906. Serial No. 294,334.

*To all whom it may concern:*

Be it known that I, SHIRL HERR, a citizen of the United States, residing at Lebanon, in the county of Boone and State of Indiana, have invented certain new and useful Improvements in Color-Changing Screens, of which the following is a specification.

This invention relates to the use of a colored liquid to form a screen of changeable coloration for stage illumination, railway signaling, optic telegraphy, lighthouse-work, &c.; and the object of the invention is to provide means for gradually or quickly changing the color or increasing or reducing the brightness by varying the thickness of the space in which the liquid is contained. The shape and size of the screen, the liquid contained within the screen, and the mechanism for adjusting the movable parts will vary according to the purposes to be accomplished.

In the accompanying drawings, which show by way of example only the application of my invention to stage illumination, Figure 1 is a vertical central section on the dotted line 1 1 of Fig. 3 of a screen having four cells mounted on a common supporting-bar. Fig. 2 is a view in side elevation of one of said cells, and Fig. 3 is a view in front elevation of one of said cells.

The illuminating device preferably consists of a plurality of diallochrome screens 4, here shown as four in number, supported in vertical position in alinement one behind the other between the lamp and the stage. One of these screens is filled with a transparent red liquid, the second with a blue transparent liquid, the third with a yellow transparent liquid, and the fourth with a black liquid which is semitransparent in a thin sheet and becomes opaque when the thickness of the liquid is increased to the maximum capacity of the screen. With the primary colors—red, blue, and yellow—the secondary colors can be produced by a proper combination of said primary colors. The black screen enables the light to be graduated from light to dark and the reverse in a gradual manner, which will avoid the noticeable and abrupt changes generally produced by the introduction or removal of glass screens of varying density. The brightness of the different colors is changed by correspondingly changing the thickness of the body of the liquid through which the rays of light from the lamp must pass in order to reach the stage, and as the mechanism for varying the thickness of the liquid element is the same in each of the four screens a description of the mechanism for one will suffice for all of them.

5 represents a supporting-rod, preferably square in cross-section, to which the four screens are attached and by which the said screens are supported. 6 is a hollow cylinder having the closed end 7. The opposite end of the cylinder is open. The end 7 has a central opening which is filled with the plate 8 of transparent glass. The joints between the glass and the end 7 are made water-tight. Mounted within the cylinder 6 and making a close sliding fit therein is the disk 9, having a central opening surrounded by the inside flanges 10, and mounted at the inner end of flanges 10 in a water-tight manner is the plate of transparent glass 11. 12 is a piece of elastic tubing, preferably rubber, which envelops the flange 10 and has one edge fastened to the flange by a wrapping of wire 13 or other suitable means. The opposite end of the tube is flattened against the end 7 of the cylinder 6 and is secured thereto by means of any suitable water-tight joint, such as the ring 14 and screws 15. This forms a hollow space or inclosure 16, which is filled with a suitable colored liquid, and the quantity of that liquid between the glass plates 8 and 11 determines the brightness of the colored light produced by the rays of light passing therethrough. By moving the disk 9 in or out of the cylinder 6 the glass plate 11 will be made to correspondingly approach toward or recede from the glass plate 8, thereby changing the thickness of the column of liquid between the two glasses. The disk 9 has a series of circumferential radial pins 19, which pass through the transverse slots 20 in the cylinder 6. Mounted on the outside of the cylinder 6 is the sleeve 22, having the oblique slots 24, through which the pins 19 are projected. The sleeve 22 is adjustable in a rotary direction controlled by the pins 29, which enter the circumferential slots 25 in said sleeve 22. The sleeve is provided with the lug 26, by means of which, as a handle, the sleeve 22 is adjusted upon the cylinder 6. A movement thus imparted to sleeve 22 will cause the disk 9 to be moved within the cylinder 6 in a manner to increase or lessen the distance between the glasses 8 and 11. The cylinder end 7 has the bracket 27, with a square opening, through which is inserted the rod 5, and a given position on the rod is secured by the said screw 28.

The peculiar advantage of my diallochrome device for stage illumination is that the colors may be changed in a gradual and imperceptible manner impossible of attainment by the use of glass screens as usually employed, because of the abruptness of the changes produced by the introduction or removal of the screen.

Having thus fully described my invention, what I claim as new, and wish to secure by Letters Patent, is—

1. In a color-changing screen, the combination of a pair of parallel glass plates hermetically secured to an expansible connecting medium so as to form a liquid-holding receptacle, means for changing the distance between the glass plates and a colored liquid contained within the receptacle.

2. In a color-changing screen, the combination of an elastic tube, a pair of parallel glass plates hermetically secured at opposite ends of said tube forming a closed receptacle, a colored liquid in said receptacle and means for changing the distance between the glass plates.

3. In a color-changing screen, a closed receptacle filled with a colored liquid, said receptacle having an expansible portion and at least two parallel glass walls which walls are adjustable with relation to each other, and means for changing the distance between the glass walls.

4. In a color-changing screen, a cylinder having a closed end, said end having a central glass plate, a disk movably mounted within the cylinder parallel with the closed end, said disk having an inwardly-extended annular flange, a glass plate mounted in the inner end of said annular flange a flexible connection between the cylinder end and the flange forming a liquid-holding receptacle and a colored liquid in said receptacle.

5. In a color-changing screen, a cylinder having a closed end, a glass-closed opening at the middle of said end, a disk movably mounted within the cylinder having an annular flange, a glass plate parallel with the glass in the end of the cylinder mounted in said annular flange, an elastic connection between the flange and end of the cylinder, a colored liquid between the two glasses and means for adjusting the distance between said glasses.

6. A color-changing screen, a cylinder having one closed end, said end having a glass-closed middle opening a disk mounted within the cylinder, having a centrally-located glass-closed opening, means to form a water-tight receptacle around the two glass-closed openings, a colored liquid in said receptacle, and means for adjusting the distance between the glasses closing said openings.

7. In a color-changing screen, a plurality of screens adjustably mounted in alinement with each other on a common support, each of said receptacles being filled with a colored liquid different in color from each of the other screens of the series, said receptacles having parallel glass walls and means for changing the distance between said glass walls.

8. In a color-changing screen, a cylinder having a closed end with a glass window at its middle, said cylinder having transverse slots, a disk parallel with the end of the cylinder movably mounted within the cylinder and having radial pins which pass through the transverse slots in the cylinder, said disk having a glass window at its middle portion, an expansible partition around the glass window extending from the disk to the end of the cylinder, and forming a water-tight receptacle, a colored liquid in said receptacle, a sleeve surrounding the cylinder said sleeve having diagonal slots to receive the radial pins from the disk, and means for imparting movement in a rotary direction to the sleeve to change the distance between said glass window.

In witness whereof I have hereunto set my hand and seal, at Indianapolis, Indiana, this 24th day of November, A. D. 1905.

SHIRL HERR. [L. S.]

Witnesses:
JOSEPH A. MINTURN,
F. W. WOERNER.